United States Patent [19]
Robbins

[11] Patent Number: 5,151,907
[45] Date of Patent: Sep. 29, 1992

[54] AUXILIARY POWER SUPPLY FOR CONTINUATION OF COMPUTER SYSTEM OPERATION DURING COMMERCIAL AC POWER FAILURE

[76] Inventor: Walter A. Robbins, 1110 Bel Marin Keys Blvd., Novato, Calif. 94949

[21] Appl. No.: 482,294

[22] Filed: Feb. 20, 1990

[51] Int. Cl.⁵ .............................................. G06F 11/00
[52] U.S. Cl. ................................ 371/66; 364/948.5; 395/200
[58] Field of Search ................... 371/66, 12, 57.1; 363/85; 365/228, 229; 364/200 MS, 900 MS

[56] References Cited

U.S. PATENT DOCUMENTS

| | | | |
|---|---|---|---|
| 4,118,768 | 10/1978 | Wilson, Sr. | 363/85 |
| 4,403,309 | 9/1983 | Nakano | 365/228 |
| 4,458,307 | 7/1984 | McAnlis et al. | 365/228 |
| 4,560,886 | 12/1985 | Ferguson | 307/64 |
| 4,611,289 | 9/1986 | Coppola | 371/66 |
| 4,757,505 | 7/1988 | Marrington et al. | 371/66 |
| 4,763,333 | 8/1988 | Byrd | 371/66 |
| 4,766,567 | 8/1988 | Kato | 371/66 |
| 4,771,407 | 9/1988 | Takemae et al. | 371/66 |
| 4,812,677 | 3/1989 | Perry | 371/66 |
| 4,841,474 | 6/1989 | Zandveld et al. | 371/66 |
| 4,857,756 | 8/1989 | Haneda | 365/228 |
| 4,868,832 | 9/1989 | Marrington et al. | 371/66 |
| 4,907,183 | 3/1990 | Tanaka | 365/229 |
| 4,908,790 | 3/1990 | Little et al. | 371/66 |
| 4,908,799 | 3/1990 | Gaudronneau | 365/228 |
| 4,916,662 | 4/1990 | Mizuta | 365/228 |
| 5,003,192 | 3/1991 | Beigel | 365/228 |
| 5,007,027 | 4/1991 | Shimoi | 365/229 |

Primary Examiner—Jerry Smith
Assistant Examiner—Phung My Chung

[57] ABSTRACT

An auxiliary direct current electrical power source for protection of a wide variety of DC powered circuits, in particular those of computer systems, upon loss of commercial alternating current (AC) power, to sustain necessary or required functions for the full duration of the ordinary utility company AC power loss. The direct current power source will generally be one or more rechargeable gel cell batteries that are switched directly onto the protected device's internal DC power bus when a loss of AC power is sensed by the present invention. The switch to auxiliary power is inhibited if the protected device was in a manually turned off state at the time of AC loss. At the time of AC power restoral, a time delay ensures that the protected device's own internal power supply will be fully operational before the batteries are switched off the internal DC power bus. If the batteries fall below a predetermined voltage, the auxiliary power supply will switch itself off to avoid unduly low voltage to the protected device or damage to the batteries. During normal AC power conditions, the batteries will be recharged and maintenance charged.

20 Claims, 2 Drawing Sheets

AUXILIARY POWER SUPPLY FOR CONTINUATION OF COMPUTER SYSTEM OPERATION DURING COMMERCIAL AC POWER FAILURE

BACKGROUND —FIELD OF INVENTION

This invention relates to computer or similar systems, particularly to the supplying of direct current electrical power to computer or similar system circuits upon loss of commercial alternating current power, to sustain computer functions for the duration of the AC power loss.

BACKGROUND—DESCRIPTION OF PRIOR ART

Heretofore, for computer systems, especially microcomputers, only limited and expensive means existed to prevent loss of data or computational function when there was a loss of AC (commercial or utility company) power to the computer's own primary or main power supply. Available means are: (1) a DC to AC inverter, commonly known as an Uninterruptable Power Supply (UPS), that provides back-up or standby AC power for 5-15 minutes at a retail cost of approximately $1 per watt or more, (2) a software program that periodically stores all volatile RAM memory to a hard disk data storage device, and initiates a restoral back to the RAM memory from the hard disk device when the computer is re-started after the power failure. This method is relatively inexpensive and works on all IBM PC compatible computer systems, but is software and, therefore, will not work on the wide variety of software "incompatible" computers. (3) A recent entry into this field is a hardware/software product that keeps the computer operational only long enough (after power failure) to store RAM to disk similar to method #2 above; and also is specific only to a limited range of computers.

Method #1 above only allows the computer user an opportunity to complete a work-in-progress within the short time limit available, and then to manually shut down the computer. However, many tasks exceed this time limit, such as long computations or data sorting processes, that may not be capable of being interrupted while in progress. Furthermore, since this shut-down process requires operator intervention, if the computer is unattended, even temporarily, the shut-down process may not take place and data can be lost. In addition, many users would like to keep the computer operational for the duration of a power failure to retain FAX, VOICEMAIL, MODEM, and other functions. Larger computer systems require higher capacity, more expensive, DC-AC inverters.

Method #1 Uninterruptable Power Supplies also have an inefficiency inherent in the process of converting (inverting) DC from batteries to AC, and then the computer's power supply converts the AC back to DC with another loss of efficiency. This inefficiency translates to a shorter standby time for a given battery capacity. Relatively high cost results from complex circuitry to regulate the AC voltage and frequency. This invention, in contrast, is not an inverter and has no conversion loss and no need for complex regulation circuitry.

Method #2 above has the following disadvantages: (a) periodic storage of RAM to disk takes CPU processing time and interrupts the work-in-progress, thus annoying the user and slowing use of the computer, and (b) some loss of data results from the time interval between the time of the last automatic RAM save-to-disk to the time of power failure. For instance, the user may choose to have the data saved every 15 minutes, so that the work interruptions only occur four times an hour; so the potential work lost in the event of a power failure is up to 15 minutes. All computer use is immediately terminated at the time of power failure. Being a software method, it is specific to a limited number of computers.

Method #3 above is complex and costs are similar to #1. Similarly, all computer use is immediately terminated with the power failure. However, it does not annoy the user or slow the computer use as does method #2. This appears to be covered by U.S. Pat. No. 4,458,307. Being software and add-on hardware, it is specific to a limited number of computers.

OBJECTS AND ADVANTAGES

Accordingly, several objects of the invention are that full computer operation will be automatically sustained during a commercial or utility company AC power failure; the length of time of standby power can be easily extended by the addition of more or larger batteries or other sources of direct current power; and a highly efficient means is provided by applying the direct current directly to the computer system's internal power bus, thereby avoiding complex, costly, and inefficient conversion from DC to AC to DC.

The advantages are that all computer operations may continue during a power failure without any operator intervention; vital functions like Fax, VoiceMail, and Modem use can be sustained; normal use of the computer is unchanged while commercial power is present; it is essentially universal in application to a wide variety of, otherwise incompatible, computer systems; virtually unlimited time of standby power is available by the simple addition of more batteries or power sources; it is simple, direct, and efficient.

Further objects and advantages of the invention will become apparent from a consideration of the drawings and ensuing description of it.

DESCRIPTION OF INVENTION

Figure 2:
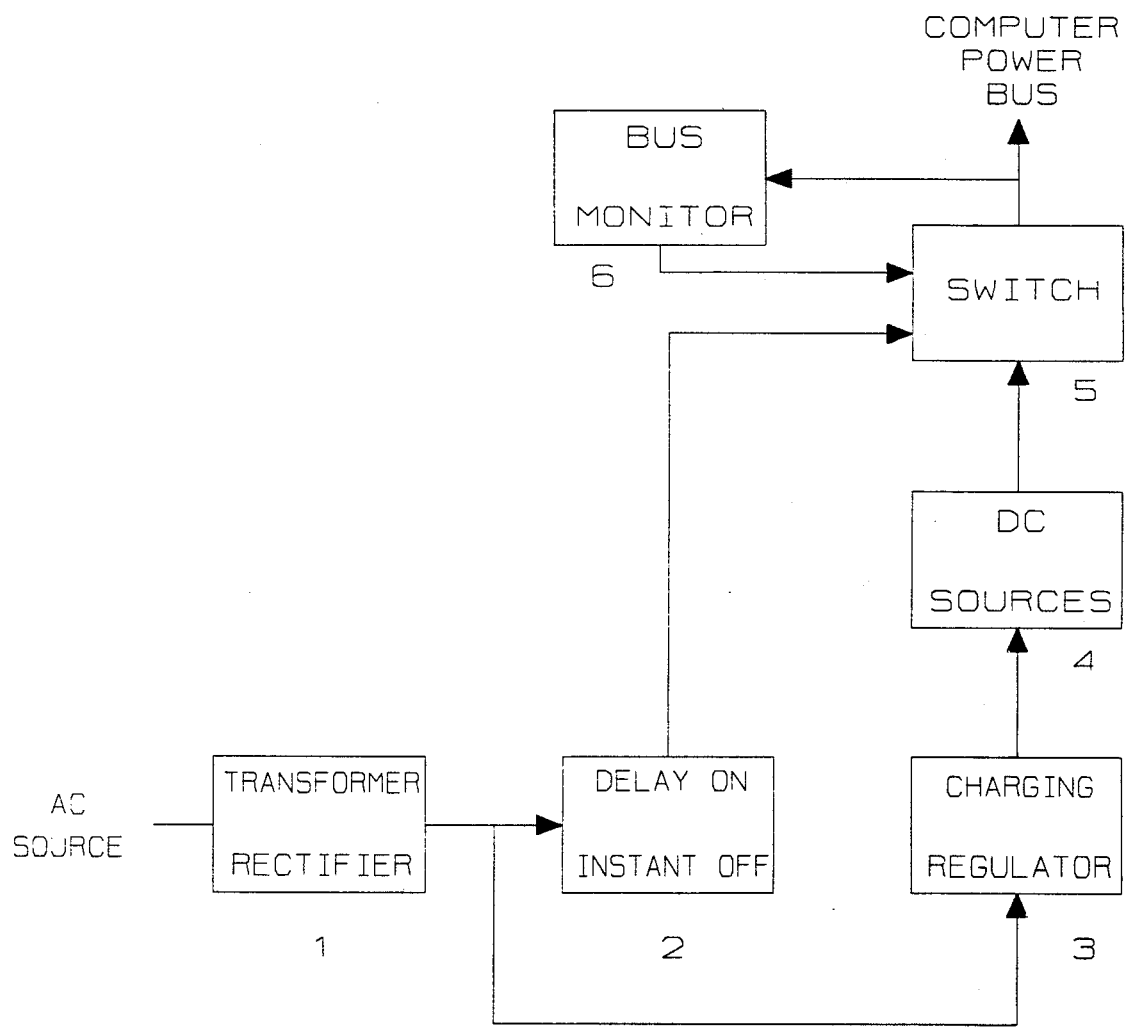
FIG. 2 is a block diagram of said embodiment.

FIG. 2 shows a block diagram according to one preferred embodiment of the invention. The Transformer/Rectifier 2 provides direct current to the Delay Circuit 2 and the Charging Regulator 3. The Delay On/Instant Off Circuit 2 controls the Switch 5 relative to AC power condition. The Bus Monitor 6 also controls the Switch 5, relative to computer on/off status and DC Sources 4 condition. The Charging Circuit 3 charges and maintains the DC Sources 4. The Switch 5 connects and disconnects the DC Sources 4 from the Computer Power Bus.

Figure 1:
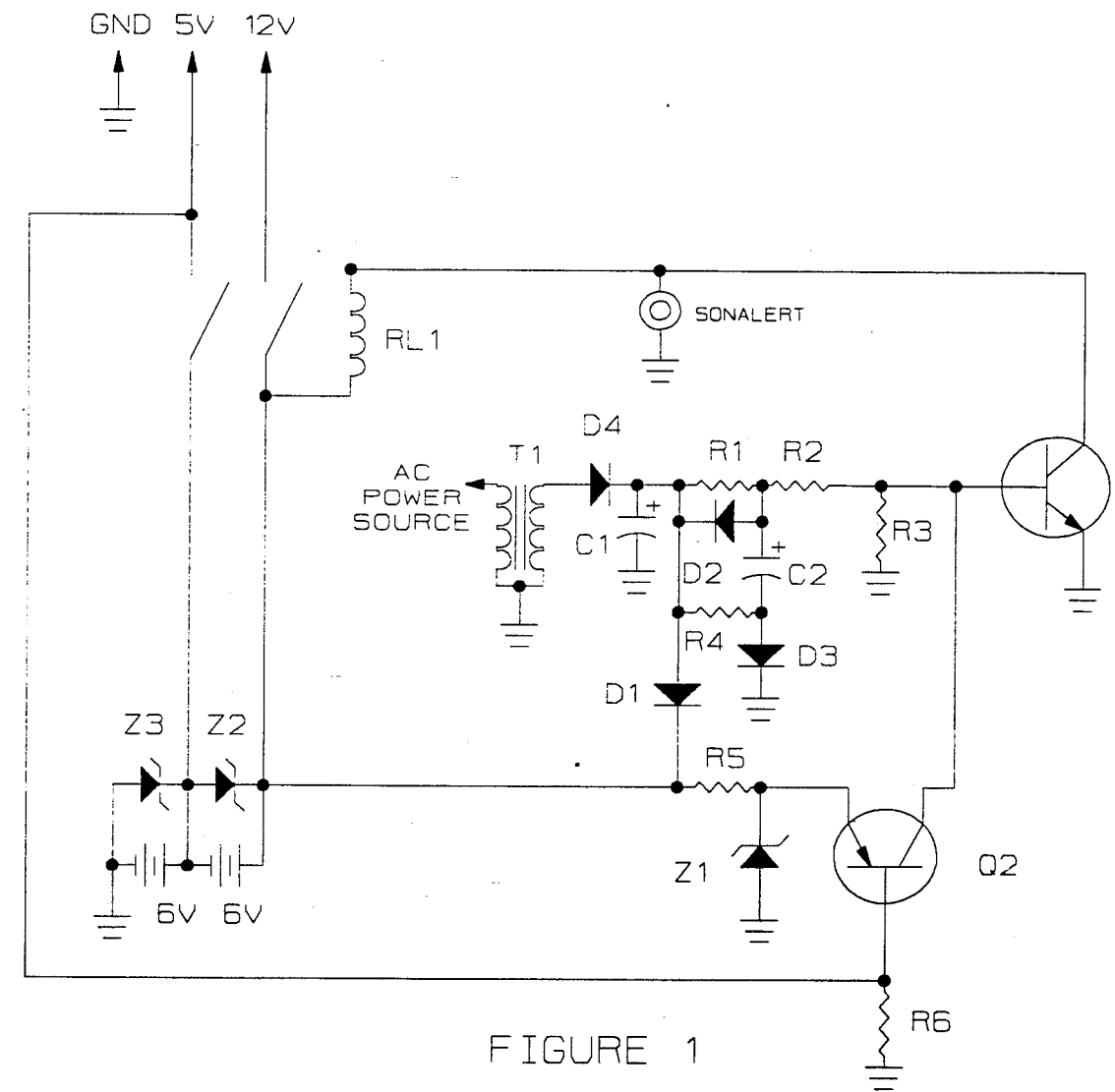
FIG. 1 is one embodiment of the invention showing the essential circuit design.

FIG. 1 shows a circuit diagram according to one preferred embodiment of the invention. The invention comprises a transformer and rectifying element whose primary winding is connected to an AC power source, whose secondary is about 14 volts direct current. C1 and C2 are electrolytic capacitors of about 3.3 mF and 1,500 mF respectively and rated at about 20 working volts.

R1-R6 are resistors of about ¼ watt rating with about the following values in Ohms: R1 4.7 k, R2 1 k, R3 680, R4 330, R5 680, R6 470.

Q1 is a general-purpose silicon high-speed, medium-power NPN switching transistor. Q2 is a PNP switching transistor similar to 2N3906.

RL1 is similar to a DPST 12 volt 80 mA relay. Z1 is about a 1 watt 5.1 volt Zener diode. Z2 and Z3 are about 5 watt 6.8 volt Zener diodes. D1-D3 are about 1 Amp 50 PIV diodes.

OPERATION OF INVENTION

An industry standard has developed that virtually all computer system processing means operate using 5 volts DC; and that virtually all disk storage devices use 5 volts and 12 volts DC. Computer processing means and disk storage means are tolerant to some overvoltage and undervoltage. "6 volt" and "12 volt" wet (and gel) cell storage batteries operate within this range of over-/undervoltage, and are inexpensive and readily available. Therefore, a means of providing 5 and 12 volts from battery power applied directly to the computer's internal DC power bus is inexpensive, efficient, and provides substitute power time limited only by battery capacity.

The invention provides means to sense a loss of AC power (sensing a power failure), a means to charge the batteries, a means to switch over to battery power, a means to connect to the computer power bus, a means to sense whether or not the computer was "on" at the time of power failure, a means to delay switching back to the computer main power supply on restoral of power failure in order to allow time for the computer main power supply to restore and stabilize bus voltages, a means to sense a low battery condition and shut down the Auxiliary Power Supply before any damage might otherwise occur to the computer or batteries, a means to prevent overcharging of the batteries, and a means to audibly signal a switch to standby power.

The 5 volts is provided by a "6 volt" wet cell battery with means to switch/connect to computer power bus at time of power failure. The 12 volts is provided by a second "6 volt" wet cell battery connected in series with the other 6 volt battery with similar means to switch/connect to the computer power bus at time of power failure. Other direct current power source means could be provided, but wet or gel cell batteries provide good capacity and reliability per unit cost.

An alternative means to provide 5 and 12 volts is to have one "12 volt" wet cell battery (or other power source) which powers the 12 volt bus, and a means to reduce the 12 volts down to 5 volts to power the 5 volt bus. However, the 5 volt circuitry then becomes more complex, less efficient, generates heat, and can require filtering and regulation means. Yet, a somewhat greater availability of 12 volt batteries over 6 volt may justify use of this method. This means could be provided by use of a Motorola MC34064 or equivalent circuit and a MOSFET switching transistor with filtering means, such as described in Motorola publication ADI1483; or as simply as a power MOSFET with a Zener reference (with no filtering necessary).

The means for accessing the computer power supply bus will generally be through the industry standard power connector for disk drives. Normally, this connector is used as a power SOURCE for drives. However, power may also be supplied TO this connector by the invention since the connector is wired directly to the power bus, and the power will then be available to the computer; in effect a "back door" to the bus. This means provides an industry standard connection that works with ALL computers using an industry standard drive, even when these computers are otherwise "incompatible" (e.g. it will work on the mutually incompatible IBM PC, Apple, Atari, Amiga, and all models-all brands that use 5¼" or 3½" drives either floppy or hard disk drives). Thus, this invention is essentially universal unlike methods #2 and #3.

It should be noted that some computers use negative (−)12 volts DC as well as 5 and (+)12. This voltage, an industry standard to the IBM PC class and others, is used very rarely and only for limited RS232 applications. It is believed that 99% of all computers will have no need for this voltage even when the primary or main computer power supply provides it. However, the invention can easily provide means to supply −12 volts DC (as well as other voltages) by using a separate battery or batteries; but computer bus access would necessarily be through a "main board" power connector rather than disk drive connector (since −12 volts is not available on the standard disk drive power connector). Therefore, this means would not be so universal in application, and would require connection means specific to the various computers and a more complex means to charge the batteries.

It should also be noted that many devices other than computers may benefit from this invention, e.g. virtually any device that has a power supply, whose source is AC power, that provides low direct current voltages. The invention could be connected to these other devices by their power connectors, fuses, or merely connector taps.

The Auxiliary Power Supply will be connected to the same commercial AC power source as that powering the computer, e.g. plugged into the same power outlet. The AC power will be used as a source to recharge and float charge (maintain the charge of) the batteries and to provide a means to sense a power failure. This would normally be a simple low voltage transformer and diode full-wave bridge rectifier applied to C1 as shown in FIG. 1.

At the time of a commercial AC power loss, the invention will ignore the loss if the computer was not operating at said time (i.e. turned off), by sensing that the computer had no DC power on its power bus at the time of the power failure. This can be accomplished by the combination of Q2, R5, Z1, and R6 described below. When no DC power is present on the computer 5 volt bus, Q2 will be conductive—causing Q1 to remain conductive and RL1 to remain operated despite the AC power loss, thus keeping the direct current power sources isolated from the computer or similar system's DC power bus.

Other means to sense on/off status could be used as well, for example, a means to monitor the AC current being drawn by the computer or similar device. Any AC current above a predetermined threshold would signal an "on" status, and current below that threshold would signal "off" status. However, such circuitry would tend to be more complex and less direct than merely monitoring the DC power bus.

If, at the time of power failure, the computer was turned on (providing DC power from its main power supply), the Auxiliary Power Supply will switch the batteries onto the DC bus before the bus exhausts the DC voltages contained in its filtering elements. Therefore, DC bus power will not be interrupted and the computer will continue to operate. If necessary, the storage capacity of these filtering elements can be augmented as described below.

The switching means (shown in FIG. 1 as RL1) may be electromechanical or solid-state. The former has low voltage drop across the contacts, and in the use anticipated where the current may exceed 10 Amps, low loss is important. However, while the former has the advantage of low loss, it may change state too slowly for some applications, i.e. in some computers the DC bus voltages may exhaust the stored energy in its filtering elements before the relay changes state. In that event, the latter means, for example MOSFET switching transistors or SCRs combined with a positive-shut-off means, would be preferred. The addition of a large capacity electrolytic could, however, augment the storage capacity of the power bus as described below, and obviate the need for fast switching.

In drawing FIG. 1, this switching operation would be described as follows:

At the time of commercial AC power failure, there will be an immediate loss of voltage to R1, R2, and R3, thus causing a loss of conductive bias to Q1, turning Q1 off and releasing RL1. C2 would have been fully charged at the time of power loss, but will be prevented from providing any bias voltage to Q1 by D3 becoming non-conductive (back-biased) at time of AC power loss. C1 is a filtering element that may be required to avoid relay "buzzing" from DC ripple voltages.

C2 will discharge rapidly through D2 and R4, thus allowing the delay interval described below to reset quickly and be ready for AC power restoral following even a brief power loss. D2 will be non-conductive (back-biased) so long as AC power is present. RL1 will release rapidly as Q1 turns off, thus applying battery power to the computer power bus in a timely fashion.

At the time the power failure is restored, a predetermined delay period (determined primarily by the values of R1 and C2) will delay switching the batteries off the DC power bus. This will allow sufficient time for the computer's main power supply to turn on and stabilize. The batteries may be connected to the bus for a limited time coexisting with the main power supply voltages without incident.

In drawing FIG. 1, this delay period operation would be described as follows:

At the time of commercial AC power application or restoral, R1 and R2 form a voltage divider that will allow C2 to charge slowly through D3 to a voltage substantially higher than the forward bias voltage of Q1, to provide a longer delay time. R3 is used to adjust Q1 saturation bias. When C2 charges to a predetermined level, Q1 will conduct and operate relay RL1, thus isolating the batteries from the computer power bus.

An alternative to this restoral delay time would be to have a large capacity (e.g 0.1 Farad) electrolytic capacitor connected at all times to the computer bus, especially the 5 volt bus, whereby the switching off of the batteries could be immediate upon AC power restoral and the capacitor would provide DC power until the computer's internal power supply becomes fully operational. This would also have an advantage at the time of AC power loss, to wit: this capacitor would provide direct current power to the computer bus during the time the relay changes state to switch the batteries onto the bus.

If, during an extended power failure, the batteries reach a predetermined low voltage condition, the batteries will be switched off the DC power bus to prevent any possible damage to the computer or batteries by a low voltage condition. This should be viewed merely as a safety element since some computer or similar device circuits may be damaged by low voltage conditions such as a "brown out" condition of the utility company if this invention were not used. In other words, since virtually all computer power supplies continue to operate at a low voltage condition during a brown out, it is not directly essential to the standby power supply operation and should be viewed as an improvement thereon.

In drawing FIG. 1, this operation would be described as follows:

R5 and Z1 present a reference voltage, e.g. about 5.1 volts, to the emitter of Q2. When the 5 volt bus drops to less than approximately 4.5 volts applied to the base of Q2, Q2 will conduct; which in turn will cause Q1 to conduct, operating RL1 and switching the batteries off the computer bus.

After the power failure is restored, the batteries will be recharged and float charged automatically through D1. D1 is required to prevent the batteries from keeping Q1/RL1 operated during a power failure. Z2 and Z3 exemplify one simple method to balance the recharging of the two 6 volt batteries, and prevent overcharging. Another method would be to place one Zener diode, e.g. 14 volt rating, from the cathode of D1 to ground (to prevent overcharging) and balancing resistors across the batteries.

For the duration of the standby power operation, an audible alert tone will sound.

It should also be noted that another possible embodiment of this invention would be to keep the batteries switched to the computer system's direct current power bus at all times the computer is turned on, and only switching them off the bus when the computer is turned off. The computer itself would then provide the charging current for the batteries. The advantage to this embodiment would be that no switching (and switching time concerns) on power failure or restoral would occur, and circuitry would be even more simple. The invention would provide an external means to turn the computer or similar device on and off (substituting for the computer's on/off switch which would always be left in the on position) and switch the batteries off the bus as the AC power is switched off to the computer. This external means could be as simple as ganged mechanical switches that switch the batteries along with the AC power.

The entire invention, therefore in this other embodiment, would be comprised of batteries connected through a ganged mechanical switch means to the device to be protected via an appropriate DC power connector, and an AC power cord to connect to a wall outlet, and a power outlet to which the computer would connect.

CONCLUSION, RAMIFICATIONS AND SCOPE OF INVENTION

Thus, it can be seen that the invention provides a means to allow a device, especially microcomputer, to continue operation unaffected by a commercial AC power failure, with no loss of data, for extended periods of time—time limited only by battery capacity (which can be easily extended by provision of more or larger batteries—a relatively inexpensive process). The invention provides a simpler, more efficient, and less costly means because it avoids DC to AC conversion. The invention takes no time from operation of the computer CPU, and, therefore, does not delay or annoy the user of the computer.

This invention has no similarities to methods 1-3 above. It is not a DC to AC inverter. It utilizes no software. It maintains operation of the computer, rather than requiring a shut-down and restarting process. All computer functions remain available, with very limited exception, during the power failure (subject only to the easily extendable battery life). It is more efficient and less costly than previous art. It is essentially universal, unlike methods 2 and 3 above.

The invention could also be used for any number of non-computer devices where access to their internal DC voltages is reasonably available. The appropriate voltages of batteries or other DC power sources would then be provided. These are described in the claims as "similar device".

While the above description contains many specificities, these should not be construed as limitations on the scope of the invention, but rather as an exemplification of one preferred embodiment thereof. Many other variations are possible. For example, a virtually unlimited number of different DC power bus voltages could be supplied by use of the appropriate batteries or other DC power sources and solid state or mechanical switches, all controlled by the basic means described above; and connection to the DC power bus could be by various means, such as other connectors, taps, fuse holders, etc., so that the invention could be used by any computer or virtually any electronic device that uses internal DC power initially derived from AC power; low battery considerations may found to be unnecessary in that few devices today contain inherent means to shut off in the event of a "brown out", so the electronics industry apparently considers it an unimportant safety feature. Accordingly, the scope of the invention should be determined not by the embodiments illustrated, but by the appended claims and their legal equivalents.

I claim:

1. A means to provide auxiliary direct current power to a device to be protected utilizing low voltage direct current power converted from alternating current power, to provide uninterrupted operation during an alternating current power failure, comprising:
   a) a monitoring means for monitoring an alternating current power source for failure and providing a first indication of failure when said alternating current power source falls below a predetermined voltage, and a second indication of restoration of said alternating current power whenever said alternating current power source returns to and rises above said predetermined voltage for longer than a predetermined period of time,
   b) a power supply means receiving energy from said alternating current power source for converting and delivering power to said auxiliary direct current power system during nominal operation of said alternating current power source,
   c) a source or sources of stored direct current power means, including storage batteries, connected to a change-over switch means,
   d) said change-over switch means to connect the direct current power source(s) to a device to be protected's internal direct current power bus, and connector means therefor, controlled by said first and second indications of power failure and restoration,
   e) a means to monitor a device to be protected's on/off status,
   f) a means to inhibit said change-over switch means when said device to be protected is in a turned off state,
   g) a means to inhibit said change-over switch means change-of-state, following said second indication of commercial alternating current power restoral, until such time as said device to be protected's internal main direct current power supply is capable of providing nominal power,
   whereby an efficient and direct means is provided for substitute or auxiliary direct current power following a loss of commercial alternating current power and thereby maintaining the device to be protected's system operation for the duration of said loss.

2. The invention of claim 1 wherein a means is provided to sense when said direct current power source(s) reaches a predetermined low voltage and to disconnect and keep disconnected, by said change-over switch means, said direct current power source(s) from said device to be protected's direct current power bus, until said alternating current power source returns to nominal.

3. The invention of claim 2 wherein a means is provided to charge said direct current power source(s) comprising a power transformer(s) and full wave diode bridge(s), and a means to limit charging to nominal charging voltage.

4. The invention of claim 2 wherein a means is provided to prevent overcharging of said direct current power source(s) comprising zener diodes placed electrically in parallel with said direct current power source(s) to limit charging to nominal charging voltage.

5. The invention of claim 2 wherein said monitoring means for monitoring an alternating current power source for failure initiates said change-over switch means to connect said direct current power source(s) to the device to be protected internal direct current power bus and is provided by said means to charge said direct current power source(s).

6. The invention of claim 2 wherein said change-over switch means is controlled by the output of said power supply means receiving energy from said alternating current power source for delivering power to said auxiliary direct current power system when normal alternating current power is nominal.

7. The invention of claim 2 wherein said change-over switch means to connect to the device to be protected's internal direct current power bus is comprising electromechanical switches.

8. The invention of claim 2 wherein said change-over switch means to connect to the device to be protected's internal direct current power bus is comprising solid state or electronic switches.

9. The invention of claim 2 wherein said change-over switch connector means is comprising a direct current power connector for disk drive systems.

10. The invention of claim 2 wherein said means to inhibit said change-over switch means when said device to be protected is in a turned off state at the time of said power failure is comprising an output from said direct current power bus connected to an electronic switching valve which in-turn controls the change-over switch means.

11. The invention of claim 2 wherein said means to monitor the device to be protected's on/off status and said means to inhibit said change-over switch means when said device to be protected is turned off is provided by said means to sense when said direct current power source(s) reaches a predetermined low voltage.

12. The invention of claim 2 wherein a means to sense when said direct current power source reaches a predetermined low voltage and to disconnect and keep disconnected said direct current power source from the device to be protected's direct current power bus via said change-over switch means is provided comprising an output from said direct current power bus connected to an electronic switching valve and voltage reference which in-turn controls the change-over switch means.

13. The invention of claim 2 wherein said means to inhibit said change-over switch means change-of-state, following said second indication of alternating current power restoral, until such time as said device to be protected's internal main direct current power supply is capable of providing nominal power, is an electronic time delay circuit with a predetermined time delay.

14. The inventions of claim 2 wherein said means to inhibit said change-over switch means change-of-state, following said second indication of alternating current power restoral, until such time as said device to be protected system's internal main direct current power supply becomes capable of providing nominal power, is a means to detect a reduction in current flow from said direct current power source(s).

15. The invention of claim 2 wherein a means is added comprising a short-term direct current storage means continuously connected to said device to be protected's direct current power bus of sufficient capacity to provide power sufficient to maintain said device to be protected's operation following said second indication of alternating current power restoral, until such time as said device to be protected's internal main direct current power supply becomes capable of providing nominal power.

16. The invention of claim 2 wherein a means is provided, including a direct current operated sounding device receiving direct current from said change-over switch means, to audibly signal the switch to the Auxiliary Power Supply.

17. The invention of claim 2 wherein a monitoring means is provided to sense the restoral and stabilization of said device to be protected's main power supply and initiate disconnection of said stored direct current power means after said stabilization.

18. The invention of claim 2 wherein said means to monitor the device to be protected on/off status is a means to monitor said internal direct current power bus, providing an indication of direct current power,
   a) a means to inhibit said change-over switch means when direct current is absent from said device to be protected internal direct current power bus.

19. A means to provide auxiliary direct current power to a device to be protected utilizing low voltage direct current power converted from alternating current power, to provide uninterrupted operation during an alternating current power failure, comprising:

a) a power transformer means including a primary winding and a secondary winding receiving power from an alternating current power source,
b) a rectification means at the output of said secondary winding providing a first direct current voltage source,
c) a voltage dividing resistive means connected from said first direct current voltage source to ground potential,
d) a capacitive means and first diode means allowing said capacitive means to charge through said first diode means from said voltage dividing resistive means to ground potential,
e) a second diode means and first resistor means connected in series across said capacitive means, wherein the cathode of said first diode means is connected to said first direct current voltage source thereby providing a means to discharge said capacitive means,
f) a first switch means whose input is connected to said voltage dividing resistive means for applying a grounding potential at its output to the control element of a change-over switch means when said commercial alternating current power source is operative following a time delay determined by the voltage dividing means and said capacitive means,
g) a singular or plural unit second source of direct current voltage connected to the input of said change-over switch means,
h) a singular or plural unit connector means to connect the output of said change-over switch means to the direct current power bus of the device intended to receive said auxiliary direct current power,
i) a third diode means connecting from the first direct current voltage source to said second source of direct current voltage for the purpose of supplying charging voltage,
j) a voltage reference means, including a zener diode, connected from the output of a second resistor means connected to said second source of direct current voltage,
k) a third resistor means connected from said single or plural connector means to ground potential,
l) a second switch means that becomes operative when the voltage present at said third resistor means drops below a reference voltage dependent on said voltage reference means, an output from which connects to the input of said first switch means,
m) An output from said second switch means that connects to the input of said first switch means,
n) a means to prevent overcharging and to balance charging of said second direct current voltage source,
whereby an efficient and direct means is provided to substitute direct current power following a loss of commercial alternating current power and thereby maintaining device to be protected system operation for the duration of said loss.

20. The invention of claim 19 wherein there is added a smoothing capacitor means, sufficient in capacity to remove unwanted ripple voltage, connected to said first direct current voltage source.

* * * * *